United States Patent [19]
Braun et al.

[11] 4,146,516
[45] Mar. 27, 1979

[54] THIXOTROPIC MIXTURE

[75] Inventors: Helmut Braun; Helmut Rinno, both of Hofheim am Taunus; Werner Stelzel, Bad Soden am Taunus, all of Fed. Rep. of Germany

[73] Assignee: Hoechst Aktiengesellschaft, Frankfurt, Fed. Rep. of Germany

[21] Appl. No.: 794,270

[22] Filed: May 5, 1977

[30] Foreign Application Priority Data

May 7, 1976 [DE] Fed. Rep. of Germany ....... 2620189

[51] Int. Cl.$^2$ .......................... C08L 1/26; C08L 53/10
[52] U.S. Cl. ........................... 260/17 R; 260/29.6 BE; 260/29.6 M
[58] Field of Search .................. 260/29.6 BE, 29.6 M, 260/429 J, 429.5, 17 R; 106/194

[56] References Cited

U.S. PATENT DOCUMENTS 2,933,475   4/1960   Hoover et al. .................... 260/22 R

FOREIGN PATENT DOCUMENTS 1495706   5/1969   Fed. Rep. of Germany.
2244462   5/1973   Fed. Rep. of Germany.
922456   3/1963   United Kingdom.

*Primary Examiner*—Theodore Morris
*Attorney, Agent, or Firm*—Curtis, Morris & Safford

[57] ABSTRACT

Thixotropic mixture consisting of
(a) one or several aqueous plastics dispersions containing a copolymer of $\alpha,\beta$-unsaturated compounds,
(b) a hydroxyl groups-containing protective colloid,
(c) a heavy metal chelate and
(d) optionally further usual additives for the preparation of coating compositions, wherein the copolymer of the aqueous plastics dispersion contains acetoacetate groups in an amount of from 0.35 to 7% by weight, calculated on the total weight of the copolymer.

7 Claims, No Drawings

THIXOTROPIC MIXTURE

Aqueous dispersions of synthetic plastics have been used for a long time for the preparation of paints, as they give a pleasing appearance to the surroundings. In using paints it is very advantageous, if the paints are, on the one hand, so highly viscous that they do not drip, and, on the other, can be caused to flow in such a manner that they can level out uneveness, for example, brush streaks or furrows caused by application with a brush. In the field of alkyd resin paints there have been available for a long time so-called thixotropic paints, which have these advantages, for example, owing to the addition of polyamide resin.

Thixotropic paint preparations based on aqueous dispersions of synthetic plastics are also known. With such materials the thixotropy can be obtained, for example, by incorporating special additives, such as montmorillonite or water-glass.

However, the term thixotropization insufficiently charactrerises the effect aimed at by the invention. Optimum conditions exist when the in itself structurally viscous paint, upon being subjected to a shear stress, opposes the stress with a resistance that increases as the shear stress increases, and which resistance, when a certain shear stress is reached which should be neither too high nor too low, suddenly breaks down, and the paint then has a flow behaviour typical of thixotropic paints, that is to say, a time-dependent decrease in viscosity as the shear velocity changes. Paints, which have such a rheology, do not drip from coating appliances (for example, brushes or lambskin rollers), but, under the shear stresses that usually occur during working, their viscosity becomes so low that unevenness for example, brush streaks and furrows, are able to disperse to a great extent. When left at rest the paint again builds up a higher viscosity so rapidly that in coating vertical surfaces no "curtains" can form. Furthermore, a paint having such a rheology permits in a single pass the coating of paint to be substantially thicker than is possible with paints having a simple flow behaviour. Moreover, the painter is able to work more quickly and more rationally, as the working appliances at each take-up of fresh paint, owing to the absence of dripping, can hold a larger quantity of paint than in the case of paints having conventional properties of flow.

Thixotropization can also be of advantage with non-pigmented dispersions. Thus, thixotropized dispersions often tend to be less subject to sedimentation than are non-thixotropized dispersions. Nevertheless, thixotropized dispersions, for example, like non-thixotropized dispersions, can be pumped or processed in rapidly operating machines, as the original low viscosity of the dispersion can easily be re-instated by shearing.

In German Patent Specification No. 1,242,306 is disclosed a thixotropic coating preparation based on a film-forming polymerizate, an organic polyhydroxy-compound and a titanium chelate in an aqueous medium, in which there is used as film-forming polymerizate a homo- or co-polymerizate of vinyl esters, acrylic and methacrylic esters, styrene, acrylonitrile and butadiene, as a polyhydroxy-compound a natural or synthetic water-soluble organic colloid containing hydroxyl groups, and 0.2–5% of titanium chelate calculated on the weight of the emulsion.

Although this process is superior to others previously described, it has a few disadvantages, for example, with the use of a few titanium chelates yellowing phenomena frequently appear in the paint, the tendency to yellowing increasing with an increase in the quantity of chelate. Furthermore, many of the chelates are of limited solubility in water and cause, especially at the place of instillation, a slight formation of coagulate, which, for example, in the case of gloss paints may have a disadvantageous effect on the gloss. Frequently, also, the combination of a chelate with a protective colloid, which is desired for other technical reasons (for example, a desired low water-sensitivity of the polymer film), leads to paints having an unsatifactory low gel structure. In order to achieve a sufficient gel strength, a make-shift is to increase either the quantity of chelate or of protective colloid or both, but it may be necessary to put up with the disadvantages that come more strongly into prominance with the increasing quantity of chelate (tendency to yellowing and a formation of coagulate at the place of instillation) or a viscosity becoming undesirably higher with the increasing quantity of protective colloid (whereby the flow properties of the paint may be considerably impaired).

It has now been surprisingly found that a small quantity of metal chelate and/or protective colloid can be tolerated by using aqueous dispersions of synthetic plastics, of which the polymers have side chains of the general formula

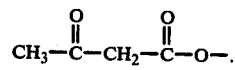

The subject of the invention is therefore a thixotropic mixture comprising (a) one or more aqueous synthetic plastics dispersions, which contain a copolymerizate of α-β-unsaturated compounds,
(b) a protective colloid containing hydroxy groups,
(c) a heavy metal chelate, and optionally
(d) further additives customarily used in the production of coating preparations, in which the copolymerizate of the aqueous dispersion of synthetic plastics contains acetoacetate groups in a quantity of 0.35–7 percent by weight, and preferably 1–3.5 percent by weight, calculated on the total weight of the copolymerizate.

The compounds containing acetoacetate groups have the formula

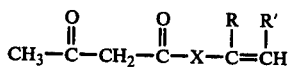

in which X may represent

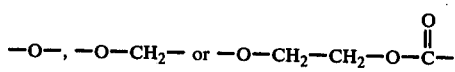

and R and R' represent H or CH$_3$.

Suitable monomers containing acetoacetate groups are, for example, acetoacetic acid vinyl ester, acetoacetic acid allyl ester or ethylene glycol- or propylene glycol- diesters in which one hydroxyl group is esterified with acetoacetic acid and the other hydroxyl group is esterified with acrylic acid, methacrylic acid or crotonic acid. Preferred copolymerizates are those containing acetoacetic acid allyl ester.

The use of α-β-unsaturated compounds, which are derived from acetoacetic acid, in emulsion polymerization in an aqueous medium is known. From German Offenlegungsschrift No. 1,495,706 it is also known to use such dispersions as binding agents in paints. However, it is novel to use such dispersions in coating compositions, which contain protective colloids having hydroxyl groups and to which a rheology of the kind described above can be imparted by means of heavy metal chelates.

Acetoacetate groups are outstandingly suitable as ligands for heavy metal chelates and are bound in the complex considerably more strongly than, for example, aliphatic hydroxyl groups. In U.S. Pat. Specification No. 2,933,475 it is disclosed that polymers containing acetoacetate groups can be cross-linked with metal chelates to form water-resistant coating preparations. It was therefore to be expected that by the use of polymers containing acetoacetate side chains in aqueous paint preparations containing heavy metal chelates the gel structure would be strengthened, but it could not be foreseen that the strengthening of the gel structure acts reversibly, that is to say, that by the action of stress the cross-linking can be made retrogressive.

The choice of the α-β-unsaturated compounds is not critical. There come into consideration all monomers customarily used in synthetic plastics dispersions, which can be combined with one another in an appropriate manner corresponding to requirements of practice. There are suitable, for example, vinyl esters of organic carboxylic acids, of which the carbon framework contains 1 to 30, and preferably 1 to 20, carbon atoms, such as vinyl acetate, vinyl propionate, isononanoic acid vinyl ester and vinyl esters of branched monocarboxylic acids containing up to 20 carbon atoms; esters of acrylic acid or methacrylic acid containing 1 to 30, and preferably 1 to 20, carbon atoms in the alcohol residue, such as ethyl acrylate, isopropyl acrylate, butyl acrylate, 2-ethyl-hexyl acrylate, methyl methacrylate, butyl methacrylate; aromatic or aliphatic α-β-unsaturated hydrocarbons such as ethylene, propylene, styrene, vinyl-tolune; vinyl halides such as vinly chloride; unsaturated nitriles such as acrylonitrile; diesters of maleic acid or fumaric acid such as dibutyl maleate or dibutyl fumarate; α-β-unsaturated carboxylic acids such as acrylic acid, methacrylic acid or crotonic acid, maleic and fumaric acid and also derivatives thereof such as acrylamide or methacrylamide or maleic anhydride or maleic acid monobutyl ester.

In the choice of suitable monomers or monomer combinations the generally known considerations for the production of paint dispersions are taken into account. Thus, special care is to be taken that polymers are produced which form a film under the contemplated drying conditions of the paint, and the choice of the monomers for producing copolymerizates is such that, according to the state of the polymerisation parameters, the formation of copolymers is to be expected. A few suitable monomer combinations are given below:

Vinyl acetate/butyl acrylate/acetoacetic acid allyl ester.
Vinyl acetate/dibutyl maleate/acetoacetic acid allyl ester.
Vinyl acetate/dibutyl fumarate/acetoacetic acid allyl ester.
Vinyl acetate/isononanoic acid vinyl ester/acetoacetic acid allyl ester.
Vinyl acetate/2-ethylhexanoic acid vinyl ester/acetoacetic acid allyl ester.
Vinyl acetate/®Versatic-10-acid vinyl ester/acetoacetic acid alyl ester.
Vinyl acetate/ethylene/acetoacetic acid allyl ester.
Vinly acetate/ethylene/vinyl chloride/acetoacetic acid allyl ester.
Ethyl acrylate/methyl methacrylate/(meth-)acrylic acid/acetoacetic acid allyl ester.
Isopropyl acrylate/methyl methacrylate/(meth-)acrylic acid/acetoacetic acid allyl ester.
Butyl acrylate/methyl methacrylate/(meth-)acrylic acid/acetoacetic acid allyl ester.
Isobutyl acrylate/methyl methacrylate/(meth-)acrylic acid/acetoacetic acid allyl ester.
2-Ethylhexyl acrylate/methyl methacrylate/(meth-)acrylic acid/acetoacetic acid allyl ester.
Ethyl acrylate/styrene/methyl methacrylate/(meth-)acrylic acid/acetoacetic acid allyl ester.
Butyl acrylate/styrene/methyl methaxrylate/(meth-)acrylic acid/acetoacetic acid allyl ester.
2-Ethylhexyl acrylate/styrene(meth-)acrylic acid-/acetoacetic acid allyl ester.

As components in the mixtures of the invention there are preferred copolymerizates containing vinyl esters, because they can be prepared more easily and in greater breadths of variation with protective colloids containing hydroxyl groups than purely acrylate or styrene/acrylate dispersions.

The interfacially active system of the aqueous synthetic plastics dispersion consists of protective colloids and optionally emulsifiers. In order to obtain the effect aimed at by the invention the interfacially active system must contain protective colloids containing hydroxyl groups. As such there come into consideration, for example, natural substances such as starches, gum arabic, alginates or tragacanth, modified natural substances such as methyl-, ethyl-, hydroxyethyl- or carboxymethyl-cellulose or starches modified with acids or epoxides and also synthetic substances such as polyvinyl alcohol (with or without a residual content of acetyl) or partially esterified or acetalized or etherified polyvinyl alcohol. It is preferred to use cellulose derivatives, such as alkyl- or carboxymethyl-cellulose. The best results have been obtained with hydroxyethyl-cellulose.

The protective colloids should be used in a quantity between 0.5 and 10% by weight, preferably between 0.5 and 3% by weight, calculated on the total quantity of monomers.

There may also be used a mixture of two or more such protective colloids or in addition there may be used other protective colloids, which contain no hydroxyl groups such, for example, as polypeptides, gelatines, polyvinyl pyrrolidone, polyvinyl methyl acetamide or poly-(meth-)acrylic acid. These protective colloids generally have no influence on the rheology aimed at by the invention.

Synthetic plastics dispersions are extraordinarily complex systems. The preparation of dispersions that are suitable for the purpose of the invention, presupposes the use of the existing practices in the field of emulsion polymerization, if they are not especially described herein. Disregard of the rules of emulsion polymerization known to the expert may therefore impair important properties, for example shear stability or freeze-dew stability. It is therefore recommended in many cases to use in addition to the protective colloids emulsifiers that can contribute to increased latex stability.

As non-ionic emulsifiers there are used, for example, alkyl-polyglycol ethers such as the ethoxylation products of lauryl, oleyl or stearyl alcohol or of mixtures such as coconut fatty alcohol; alkyl phenol polyglycol ethers such as the ethoxylation products of octyl- or nonyl-phenol, diisopropyl-phenol, triisopropyl-phenol or of di- or tri-tert.-butyl-phenol; or ethoxylation products of polypropylene oxide.

An ionic emulsifiers there come into consideration principally anionic emulifiers. They may be alkali or ammonium salts of alkyl, aryl or alkyl-aryl sulfonates, sulfates, phosphates, phosphonates or compounds having other anionic terminal groups, and there may also be oligo- or polyethylene oxide-units between the hydrocarbon radical and the anionic group. Typical are, for example, sodium lauryl sulphate, sodium octyl-phenol glycol ether sulfate, sodium dodecyl-benzene sulfonate, sodium lauryl-diglycol sulfate, ammonium tri-tert.-butyl-phenol penta- or octa-glycol sulfate.

Cationic emulsifiers such, for example, as alkyl-ammonium chloride, sulfate or acetate may also be used, but as a rule dispersions having a positive zeta-potential are formed.

The quantities of the optionally used emulsifiers are within the limits customarily maintained. As ionic emulsifiers generally have a stronger emulsifying action than non-ionic emulsifiers, there are preferably used up to about 3% of ionic and up to 6% of non-ionic emulsifiers.

For initiating and continuing the polymerization there are used oil-soluble and/or preferably water-soluble radical formers or Redox systems. There are suitable, for example, hydrogen peroxide, potassium or ammonium peroxy disulfate, dibenzoyl peroxide, lauryl peroxide, tri-tert.-butyl peroxide, bis-azo-diisobutyronitrile, alone or together with reducing components, for example, sodium bisulfite, rongalite, glucose, ascorbic acid and other compounds having a reducing action.

The radical formers are used in the usual quantities of up to about 1%.

In addition, the dispersion may contain a series of other substances such, for example, as plasticisers, preserving agents, agents for adjusting the pH-value or anti-foaming agents.

The manner in which the aqueous synthetic plastics dispersions are prepared is not critical. For example, the dispersions may be prepared by the monomer-metering method, or the emulsion-metering method or the batch method or in another way that is suitable for the production of paint dispersions.

For the production of the pigment paste, which is mixed with the synthetic plastics dispersion to form the paint, there may be used the customary substances and processes known to the expert. In general a white pigment, for example, titanium dioxide rutile or anatase, chalk, kaolin and other clay or silicate minerals or mixtures of such pigments are made into a paste in water with pigment dispersing agents and thickeners, and then ground with a special disintegrating appliance. As pigment dispersing agents there are suitable inorganic substances such, for example, as sodium polyphosphates or organic compounds generally of high molecular weight such, for example, as sodium, potassium or ammonium salts of polyacrylic acid, polymethacrylic acid or salts of interpolymers of maleic acid and acrylic acid or methacrylic acid or maleic anhydride/styrene copolymers. Suitable thickeners are, for example, the protective colloids that have already been described as ingredients for the preparation of the dispersion. There may also be added to the pigment paste a series of additives, for example, pH-stabilizers, rust preventing agents, antimicrobe preserving agents, flow assistants such as glycols, glycol ethers, glycol esters or glycol ether-esters, colored pigments and other assistants. If desired, however, such additives may be added to paints complete in other respects.

It is recommended to homogenize the pigment pastes before mixing them with the dispersion, in order to obtain a pleasing appearance of the color or paint. For this purpose there are suitable the customarily used methods of disintegration such, for example, as dispersing in a dissolver or disintegration in a ball, pearl or sand mill or grinding on a roller mill.

The mixing of the aqueous synthetic plastics dispersion with the pigment paste is carried out in a manner in itself known by stirring the dispersion into the pigment paste or by stirring the pigment paste into the dispersion. It is necessary to operate so that no formation of coagulate occurs. If desired, there may be connected to the mixing stage a homogenizing section, for example, one of the appliances mentioned above.

If desired, the paint may be prepared from the pigment paste and two or more aqueous synthetic plastics dispersions, but at least one of the dispersions must fulfil the additional conditions necessary for achieving the effect aimed at by the invention, namely acetoacetate side groups in the polymer chain of the binding agent and a hydroxyl group-containing protective colloid in the interfacially active system of the dispersion, and the quantities in percent by weight must then be calculated on the sum of the monomers in all the dispersions.

The mixing ratio of synthetic plastic dispersion to pigment paste is within the limits usual for dispersion paints, that is to say, between 1:025 and 1:10, and preferably in the range between 1:05 and 1:3, the amount of solid matter in all the constituents of the dispersion relatively to the content of solid matter in all the substances present in the pigment paste being within that ratio.

However, it is also possible to thixotropize the non-pigmented dispersion in the manner described, for example, to produce non-drip clear lacquers or adhesives, the same advantages with regard to drip resistance and flow being obtained as in the case of paints prepared by pigmenting.

As metal chelates there are suitable the compounds customarily used for thixotropizing purposes in aqueous dispersion paints, which compounds are derived principally from titanium or zirconium. In the case of titanium chelates three main types can be distinguished:

1. Esters of amino-alcohols, such as are obtained by the reaction of isopropyl, n-butyl and other low molecular ortho-esters of titanic acid with amino-alcohols, for example, with diethanolamine, tri-isopropanolamine, triethanolamine, methyl-diethanolamine, β-aminoethylethanolamine, 2-amino-2-ethyl-1,3-propandiol, and in each case 2 mol of the amino-alcohol are used for 1 mol of orthotitanic acid ester. The reaction products need not be isolated, that is to say, in each case 1 mol of the chelate formed may remain dissolved in the 2 mol of alcohol liberated. The alcohol liberated may be separated by distillation, but the products obtained are difficult to handle owing to their high viscosity.

These esters contain two alkoxy and two aminoalkoxy groups per titanium atom. There may also be used esters containing three or four aminoalkoxy groups per titanium atom, but such esters are also very viscous and difficult to handle. There may also be used the lower fatty acid salts of the aminoalcohol esters, provided that they are water-soluble, such, for example, as the salt of the semi-acetate of the triethanolamine-2,1-isopropoxy-chelate.

2. Water-soluble titanium complexes of α-hydroxy-acids and barium, calcium, strontium and magnesium salts thereof, and their preparation is described in British Pat. No. 811,425 and in U.S. Pat. No. 2,453,520.

3. Chelates of β-diketones and β-keto-acid esters, which can react by alcoholysis in the enol-form with lower alkyl esters of ortho-titanic acid. As an example there may be mentioned the reaction product of 2 mol of acetyl-acetone with 1 mol of titanic acid tetra-n-butyl ester. The reaction product need not be isolated, and may be used as a solution in the alcohol, which is formed by alcoholysis of the ortho-titanic acid ester.

Suitable zirconium compounds are, for example the thixotropizing assistants, such as are described, for example, in U.S. Pat. Specification No. 3,280,050 and are prepared by the reaction of zirconyl carbonate with acetic acid, methacrylic acid or coconut oil fatty acid and isopropanol.

Such metal chelates are added to the dispersion or the otherwise complete paint in quantities between 0.05 and 5% by weight, and preferably between 0.1 and 2% by weight, calculated on the total quantity of paint. The metal chelates, may, if desired, also be added to the pigment paste immediately before it is mixed with the synthetic plastics dispersion.

The rheology aimed at by the invention is not established immediately after bringing together all the ingredients necessary for this property, but only in the course of several hours, occasionally also only after days, and then increases during storage. In general, the thickening 24 hours after the preparation of the paint or thixotropization of the dispersion is so far advanced that the technical advantages aimed at are all clearly present and the condition in which no substantial changes in the rheology occur is reached after about 10 to 14 days.

The mixtures compounded in accordance with the invention have the advantage that the technical properties aimed at, namely, little tendency to drip, good flow and the absence of a tendency to "curtain formation", can be realised either in a higher degree than without the incorporation of the acetoacetate groups or in the same degree as in the case of conventional mixtures, but with smaller quantities of protective colloid in the dispersion and/or of metal chelate in the finished product.

The following Examples illustrate the invention.

EXAMPLE 1

In a four-necked flask of 2 liters capacity, which is in a heating bath and is provided with a stirrer, reflux condenser, dropping funnel and thermometer, is heated while stirring a dispersion liquor consisting of
603 parts by weight of water
18 parts by weight of polyvinyl alcohol having a degree of hydrolysis of 88 mol percent and of which an aqueous solution of 4 percent strength has a viscosity at 20° C. of 18 cP
0.9 part by weight of sodium vinyl sulfonate
6 parts by weight of sodium dodecyl-benzene sulfonate
0.72 part by weight of $NaH_2PO_4 \cdot 2\ H_2O$
1.67 parts by weight of $Na_2HPO_4 \cdot 12\ H_2O$
1.5 parts by weight of ammonium peroxy disulfate and
60 parts by weight of vinyl acetate
and polymerization sets in. When the temperature is raised to 70° C., the metering of a mixture of 540 parts by weight of vinyl acetate and 18 parts by weight of acetoacetic acid allyl ester is commenced. The total period of metering is about 3 hours.

After the termination of the addition of the monomers, the mixture is heated for a further 2 hours at the polymerisation temperature (70° C.) with continued stirring, and then the mixture is cooled.

EXAMPLE 2

The procedure is exactly the same as that described in Example 1, except that no acetoacetic acid allyl ester is added and the quantity of water in the dispersion liquor is reduced by 18 parts by weight to 585 parts by weight.

EXAMPLE 3

In an apparatus such as is described in Example 1, a dispersion liquor consisting of
607 parts by weight of water
18 parts by weight of oleyl-polyglycol ether containing about 25 ethylene oxide units
0.2 parts by weight of sodium dodecyl-benzene sulfonate
12 parts by weight of hydroxyethyl-cellulose having an average degree of polymerisation of about 400 (molecular weight about 100,000)
1.5 parts by weight of sodium acetate
2.5 parts by weight of ammonium peroxy disulfate and
60 parts by weight of a mixture of monomers, forming part of a mixture of
450 parts by weight of vinyl acetate
150 parts by weight of isononanoic acid vinyl ester and
12 parts by weight of acetoacetic acid allyl ester,
is heated at 70° C. and at this temperature the remainder of the mixture of monomers (552 parts by weight) is metered in the course of 3 hours. After the metering, 0.5 part by weight of ammonium peroxy disulfate in 15 parts by weight of water is added, and the whole is heated for 2 hours. The content of solid matter is about 50%.

EXAMPLE 4

The procedure is exactly the same as that described in Example 3, with the exception that no acetoacetic acid allyl ester is added and the quantity of water in the dispersion liquor is reduced by 12 parts by weight to 595 parts by weight.

EXAMPLE 5

In an apparatus such as is described in Example 1 a dispersion liquor consisting of
618 parts by weight of water
18 parts by weight of nonyl-phenol polyglycol ether containing about 30 ethylene oxide units
1.5 parts by weight of sodium acetate
12 parts by weight of hydroxyethyl-cellulose having an average degree of polymerisation of about 400 (molecular weight about 100,000)
2.5 parts by weight of ammonium peroxy disulfate and 10% (62 parts by weight) of a mixture of monomers, which consists of 480 parts by weight of vinyl acetate, 120 parts by weight of dibutyl maleate and 18 parts by weight of acetoacetic acid allyl ester, is heated at 70° C. and the remainder of the mixture of monomers is metered in the course of 3 hours. After the metering, 0.5 part by weight of ammonium peroxy disulfate in 15 parts by weight of water is added and the mixture is heated to 2 hours. The content of solid matter is about 50%.

EXAMPLE 6

The procedure is exactly the same as that described in Example 5, with the exception that no acetoacetic acid allyl ester is added and the quantity of water in the dispersion liquor is reduced by 18 parts by weight to 600 parts by weight.

EXAMPLE 7

In an apparatus such as is described in Example 1, a dispersion liquor consisting of
- 622 parts by weight of water
- 18 parts by weight of nonyl-phenol polyglycol ether containing about 30 ethylene oxide units
- 1.5 part by weight of sodium acetate
- 12 parts by weight of hydroxyethyl-cellulose having an average degree of polymerisation of about 400 (molecular weight about 100,000)
- 2.5 parts by weight of ammonium peroxy disulfate and
- 60 parts by weight of a mixture of monomers which was prepared from
  - 396 parts by weight of vinyl acetate,
  - 150 parts by weight of Versatic-10-acid vinyl ester
  - 48 parts by weight of butyl acrylate
  - 18 parts by weight of acetoacetic acid allyl ester and
  - 6 parts by weight of crotonic acid is heated at 70° C. and at this temperature the remainder of the mixture of monomers (558 parts by weight) is metered in the course of 3 hours. After the metering, 0.5 part by weight of ammonium peroxy disulfate in 15 parts by weight of water is added and the mixture is heated for 2 hours. The content of solid matter is about 50%.

EXAMPLE 8

The procedure is exactly the same as that described in Example 7, except that no acetoacetic acid allyl ester is used in the polymerisation and the quantity of water in the dispersion liquor is reduced by 18 parts by weight to 604 parts by weight.

EXAMPLE 9

In an apparatus such as is described in Example 1, a dispersion liquor, consisting of
- 632 parts by weight of water
- 18 parts by weight of polyvinyl alcohol having a degree of hydrolysis of 88 mol percent and of which an aqueous solution of 4% strength has a viscosity at 20° C. of 18 cP
- 0.9 parts by weight of sodium vinyl sulfonate
- 1.0 part by weight of sodium dodecyl-benzene sulfonate
- 0.72 parts by weight of $NaH_2PO_4 \cdot 2\ H_2O$
- 1.67 parts by weight of $Na_2HPO_4 \cdot 12\ H_2O$
- 1.5 parts by weight of ammonium peroxy disulfate and
- 60 parts by weight of a mixture of monomers, which formed part of a mixture of 300 parts by weight of vinyl acetate, 150 parts by weight of 2-ethyl-hexyl acrylate, 150 parts by weight of pivalic acid vinyl ester and 18 parts by weight of acetoacetic acid allyl ester is heated while stirring, whereby the polymerisation sets in. When the temperature is raised to 70° C., the metering of the remainder of the mixture of monomers is commenced. The total metering time is about 3 hours. Immediately after the end of the addition of the monomers a solution of 0.3 part by weight of ammonium peroxy disulfate in 15 parts by weight of water is added. The mixture is heated at the polymerisation temperature (70° C.) with continued stirring for 2 hours, and the mixture is cooled. The content of solid matter is about 50%.

EXAMPLE 10

The procedure is exactly the same as that described in Example 9, with the exception that no acetoacetic acid allyl ester is used in the polymerisation and the quantity of water in the dispersion liquor is reduced by 18 parts by weight to 614 parts by weight.

EXAMPLE 11

In an apparatus such as is described in Example 1 is polymerized a dispersion having the monomeric composition
- 50 parts by weight of butyl acrylate
- 50 parts by weight of methyl methacrylate
- 3 parts by weight of acetoacetic acid allyl ester and
- 1 part by weight of methacrylic acid, and a dispersion liquor consisting of
- 106 parts by weight of water
- 1 part by weight of hydroxyethyl-cellulose of which an aqueous solution of 5 percent strength at 20° C. has a Hoppler viscosity of 80–119 c-Poise
- 0.4 part by weight of n-dodecyl mercaptan and
- 5 parts by weight of nonyl-phenol polyglycol ether containing about 30 ethylene oxide units by polymerization with a Redox system, consisting of
- 0.4 part by weight of ammonium peroxy disulfate and
- 0.13 parts by weight of sodium bisulfite. The content of solid matter is about 51%.

EXAMPLE 12

The procedure is exactly the same as that described in Example 11, with the exception that no acetoacetic acid aryl ester is added and the quantity of water in the dispersion liquor is reduced by 3 parts by weight to 103 parts by weight.

EXAMPLE 13

In an apparatus such as is described in Example 1 is polymerized a dispersion having the monomeric composition
- 75 parts by weight of vinyl acetate
- 25 parts by weight of isononanoic acid vinyl ester and
- 2 parts by weight of β-acetylaceto-ethyl crotonate, and a dispersion liquor consisting of
- 105.5 parts by weight of water
- 3 parts by weight of oleyl-polyglycol ether having about 25 ethylene oxide units
- 2 parts by weight of hydroxyethyl-cellulose having an average degree of polymerisation of about 400 (molecular weight about 100,000)

0.042 part by weight of sodium dodecyl-benzene sulfonate and
0.25 part by weight of sodium acetate by being heated with
0.5 part by weight of ammonium peroxy disulfate The content of solid matter is about 50%.

EXAMPLE 14

The procedure is exactly the same as that described in Example 13, with the exception that no β-acetylaceto-ethyl crotonate is added and the quantity of water in the dispersion liquor is reduced by 2 parts by weight to 103.5 parts by weight.

The dispersions described in Examples 1 – 8, 13 and 14 were thixotropized in the following manner: A narrow high vessel, in the center of which is an impeller stirrer a few millimeters above the bottom of the vessel, is charged to about one-half to three-fourths of its capacity with the dispersion to be thixotropized, a measured quantity of heavy metal chelate is added, and then the stirrer is operated (about 1000 revolutions per minute) for about 1 minute. Then the stirrer is removed, the vessel is closed and the mixture is kept at room temperature (about 20° to 25° C.). 24 Hours after the addition of the heavy metal chelate the gel strength is measured in a gel tester (Boucher Electronic Jelly Tester of the firm Stevens, London, Model No. BJT 400; a description of the appliance is given in British Pat. No. 1,051,276). The thixotropization was carried out in each case with 0.5% by weight, calculated on the total weight of the dispersion of ®Tilcom AT 21 (alkanolamine titanate of the firm Titanium Intermediates Ltd., London).

The results are shown in Table 1:

Table 1

| Dispersion according to Example | % of copolymerized allyl acetoacetate | Gel strength in graduations of the gel tester |
|---|---|---|
| 1 | 3 | 66 |
| 2+ | — | 61 |
| 3 | 2 | 204 |
| 4+ | — | 150 |
| 5 | 3 | 223 |
| 6+ | — | 219 |
| 7 | 3 | 163 |
| 8+ | — | 143 |
| 13 | 2 | 194 |
| 14+ | — | 150 |

+Comparison Example, not in accordance with the invention.

In all cases the gel structure could be eliminated by strong shearing stress, and when subsequently allowed to stand the gel structure built up again largely to the original gel strength.

The individual gel strengths depend very much on the composition of the dispersion and also on the nature and quantity of the heavy metal chelate and only similar dispersions can be compared directly with one another. The only matter of importance is the improvement caused by the copolymerbound acetoacetate groups. This applies also to the thixotropized dispersion paints.

The thixotropizing of dispersion paints was carried out as described below. A paint was prepared by the following recipe:

| | |
|---|---|
| 1. Water | 41.0 parts by weight |
| Aqueous solution of 3% strength of ®Tylose H 20 | 15.6 parts by weight |
| ®Calgon N (solid) | 0.4 part by weight |
| Dispersing asgent PA 30 | 3.0 parts by weight (aqueous solution of 30% strength of ammon-ium polyacrylate having a viscosity of 100-300 cP/Epprecht B II, 23° C.) |
| Ammonia 25% strength | 1.0 part by weight |
| Preservative | 2.0 parts by weight |
| Anti-foaming agent | 3.0 parts by weight |
| Titanium dioxide | 175.0 parts by weight 0.2-0.4μ particle size |
| 1,2-Propylene glycol | 10.0 parts by weight |
| are dispersed and then the 2. dispersion (content of solid matter 50%) | 710.0 parts by weight |

The liquid or soluble constituents given under 1., with the exception of the 1,2-propylene glycol, are placed in a stirring vessel in the order of succession mentioned, and the pigment therein is dispersed with a dissolver. Then the 1,2-propylene glycol is added.

For preparing the several paints the pigments paste or an appropriate portion thereof was mixed with the appropriate quantities of a dispersion, in each case about one day old, under a slow running stirrer. Then the solvents mentioned under 3. were added and subsequently the heavy metal chelates were introduced, and the conditions described for thixotropizing the dispersions (stirring for about one minute with an impeller stirrer at about 1000 revolutions per minute) were observed.

The dependence of the measured gel strengths on the nature and quantity of the heavy metal added is shown in Table 2.

Table 2

| Example No. | DET 0.5% | DET 0.8% | TET 0.3% | TET 0.5% | Tilcom AT 21 0.3% | Tilcom AT 21 0.5% | Tilcom AT 21 0.8% |
|---|---|---|---|---|---|---|---|
| 1 | 78 | — | — | 91 | — | 116 | 177 |
| 2+ | 72 | — | — | 85 | — | — | 102 |
| 3 | 74 | — | 61 | — | 100 | 135 | — |
| 4+ | 0 | — | 0 | — | 72 | 98 | — |
| 5 | 90 | — | 71 | — | 113 | 139 | — |
| 6+ | 78 | — | 0 | — | 74 | 87 | — |
| 7 | — | 125 | — | 89 | — | 121 | — |
| 8+ | — | 108 | — | 76 | — | 118 | — |
| 9 | — | — | — | — | — | 93 | 228 |
| 10+ | — | — | — | — | — | 90 | 183 |
| 11 | — | — | — | — | — | 170 | — |
| 12+ | — | — | — | — | — | 82 | — |

+Comparison Examples not in accordance with the invention.

In all cases the gel structure could be eliminated by strong shearing stress, and by subsequent storage the gel structure built up again largely to the original gel strength. DET = diethanolamine titanate, TET = triethanolamine titanate and Tilcom AT 21 = alkanolamine titanate are commercial products of the firm Titanium Intermediates Ltd., London, which have been obtained from tetra-isopropyl titanate by reaction with the appropriate alkanolamines. The numbers given are for gel strengths measured in the Boucher Electronic Jelly Tester of the firm Stevens, London, Model No. BJT 400 in graduations.

We claim:
1. A thixotropic aqueous dispersion paint comprising a mixture of
   (a) an aqueous polymer dispersion wherein the polymer is a copolymerizate of α,β-unsaturated monomers containing from 0.35 to 7% by weight of acetoacetate groups,
   (b) from 0.5 to 10% by weight of said copolymerizate of a protective colloid containing hydroxyl groups.
   (c) a heavy metal chelate in an amount of 0.05 to 5% by weight of said dispersion, and

(d) a pigment paste dispersed in said mixture, the ratio of solids in said polymer dispersion to solids in said pigment paste being in the range 1:0.25 to 1:10.

2. A dispersion paint according to claim 1 wherein said copolymerizate contains from 0.35% to 7% of acetoacetate groups.

3. A thixotropic mixture according to claim 1, characterised in that it contains hydroxyethyl-cellulose as a protective colloid containing hydroxyl groups.

4. A thixotropic mixture according to claim 1, characterised in that it contains a heavy metal chelate alkanolamine titanates or zirconates, titanium lactates or titanium acetyl-acetonates.

5. A thixotropic mixture according to claim 1, characterised in that the acetoacetate group in the copolymerizate is derived from acetoacetic acid allyl ester.

6. A thixotropic mixture according to claim 1, characterised in that, when the mixture contains more than one polymer, at least one of them contains a number of acetoacetate groups such that their quantity amounts to 0.3 to 7 percent by weight calculated on the total quantity of all of the polymers present in the mixture.

7. A thixotropic mixture according to claim 1 and wherein said copolymerizate is a copolymer of
(a) at least one monomer selected from the group consisting of vinyl esters, acrylic acid esters, methacrylic acid esters, aromatic and aliphatic $\alpha,\beta$-unsaturated hydrocarbons, vinyl halides, unsaturated nitriles, diesters of maleic acid and fumaric acid, $\alpha,\beta$-unsaturated carboxylic acids and amides thereof, maleic anhydride, and maleic acid monobutyl ester and
(b) a compound containing acetoacetate groups in a quantity such that the copolymerizate contains from 1 to 3.5% by weight of said acetoacetate groups.

* * * * *